United States Patent Office 2,753,734
Patented July 10, 1956

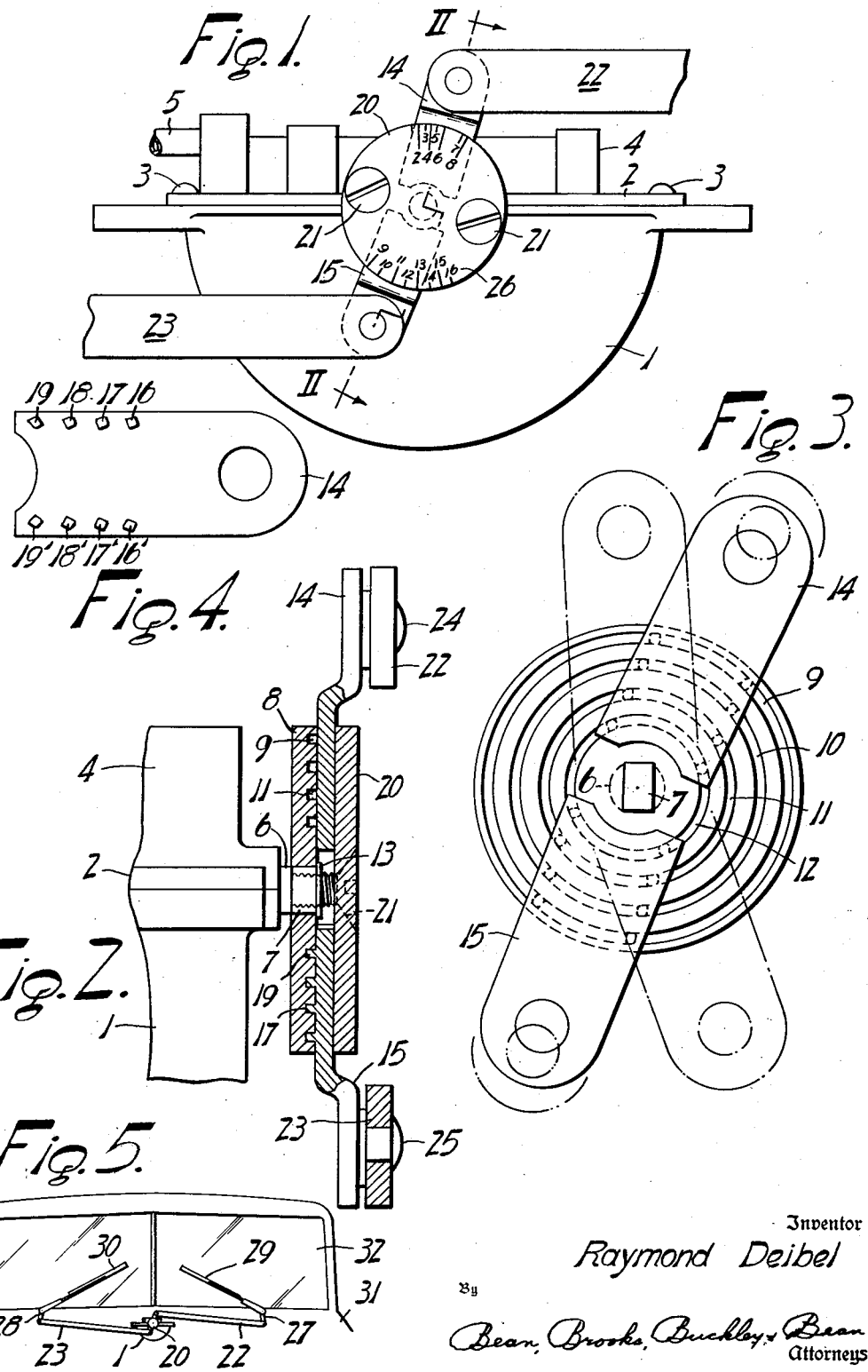

2,753,734
CRANK ASSEMBLY

Raymond Deibel, East Aurora, N. Y., assignor to Trico Products Corporation, Buffalo, N. Y.

Application January 26, 1951, Serial No. 207,990

8 Claims. (Cl. 74—522)

This invention relates generally to the windshield cleansing art, and more particularly to a windshield cleaner having a windshield wiper motor connected to a plurality of wiper blades for oscillating the same across a windshield surface to cleanse predetermined areas thereof.

In this type of windshield cleaner the wiper motor is commonly mounted within the space behind the instrument panel of the vehicle. Various other automotive accessories are also mounted within this space with the result that the wiper motor frequently must be mounted in different locations and in various positions within the space behind the instrument panel in different makes of vehicles. Thus, in an endeavor to adapt the windshield cleaner to a particular vehicle it may be necessary to mount the wiper motor in any one of an upright, tilted or inverted position, and at any one of a number of points relative to the windshield. Even where the wiper motor is mounted, for example, above the windshield, the problem remains substantially the same, because the amount of available space, and the location thereof, varies with different vehicles.

A common type of windshield cleaner in use today comprises a double-throw drive arm fixed on the shaft of the wiper motor with the opposite ends of said drive arm joined by a mechanical linkage to the wiper actuating shafts, the arrangement being such as to impart the oscillatory motion of the wiper motor shaft to the wiper actuating shafts to move the wiper blades back and forth across the windshield, either in unison or in opposition to each other, and to cause said wiper blades to assume a parked position against the bottom edge of the windshield. Varying installations in this type of windshield cleaner may differ only in the shape of the drive arm which is fixed to the motor shaft. However, even this one difference requires that, in order to equip the many styles and makes of motor vehicles in use today, numerous windshield cleaner motors must be provided by the manufacturer and kept in stock by the dealer, all identical in general makeup, but different in the shape of the drive arm.

One answer to this problem is provided in copending application Serial No. 126,190 for Windshield Cleaner, filed November 8, 1949 by John R. Oishei, now Patent No. 2,608,707, wherein means are provided adapting the wiper motor shaft to receive interchangeable drive arms of different sizes and shapes. Such an arrangement does solve the problem, and has several highly desirable features, but it possesses an objectionable feature in that it is necessary for the manufacturer to provide and the dealer to stock numerous sizes and shapes of interchangeable drive arms.

Accordingly it is an object of the present invention to reduce the number of special wiper motors required for various makes of vehicles.

Another object of this invention is to provide a windshield cleaner of substantially universal application.

A further object of the invention is to provide a windshield wiper motor incorporating an adjustable drive arm whereby to facilitate the installation thereof on different vehicles.

An additional object of the present invention is to provide a windshield wiper motor which accomplishes the aforesaid objects in a relatively simple and inexpensive manner.

With the foregoing and other objects in view, this invention comprises a new and useful windshield wiper motor to be described in detail hereinbelow and which is illustrated in the accompanying drawing, wherein Fig. 1 shows a windshield wiper motor together with the novel drive arm of the present invention and its manner of attachment to the wiper motor shaft, Fig. 2 is a view partly in section and taken along the line II—II of Fig. 1, Fig. 3 is a view of the novel drive arm and its manner of attachment to the motor shaft, with the front cover plate removed, and showing the drive arm in three positions of adjustment, Fig. 4 is a detail view of one part of the novel drive arm of the instant invention, and Fig. 5 shows the entire windshield cleaner as installed on a vehicle.

As shown in Fig. 1, the windshield wiper motor of the present invention comprises a wiper motor casing 1 and a cover plate 2 secured thereto by means of bolts 3. The wiper motor is a conventional vane type suction motor the details of which are not illustrated, and a valve member 4 is mounted on cover plate 2 whereby to periodically reverse the pressure differential within the wiper motor. An exhaust line 5 is provided on valve member 4 for connection to a source of vacuum such as the intake manifold of the vehicle, not illustrated. Wiper motor casing 1 is adapted to be mounted on the vehicle, as for exmple behind the instrument panel thereof.

Extending from casing 1 is the usual wiper motor shaft 6 having a rectangular or similarly configurated outer end 7. Keyed to the outer end 7 of wiper motor shaft 6 is a mounting plate 8 having concentric grooves 9, 10, 11 and 12 therein. The outer end 7 of wiper motor shaft 6 is peened over mounting plate 8, as at 13, whereby mounting plate 8 is securely keyed to wiper motor shaft 6 for oscillation therewith.

Two identical single-throw drive arms 14 and 15, each having a plurality of tongues 16, 17, 18 and 19 and 16', 17', 18' and 19' on each edge of the underside thereof, are mounted on mounting plate 8 with tongues 16 and 16', 17 and 17', 18 and 18' and 19 and 19' slidably interfitting with grooves 9, 10, 11 and 12. A cover plate 20 bears against drive arms 14 and 15 to lock the same in position on mounting plate 8, and is attached to mounting plate 8 by means of bolts 21. Connecting links 22 and 23 are attached at one end to the outer ends of drive arms 14 and 15, respectively, as by means of pivot pins 24 and 25. Each of said connecting links is adapted to be connected at its opposite end to the actuating shaft of a windshield wiper, as illustrated in Fig. 5. Thus, the oscillatory motion of wiper motor shaft 6 will oscillate drive arms 14 and 15 to cause connecting links 22 and 23 to correspondingly oscillate the windshield wipers back and forth across a windshield, cleansing predetermined areas of the same. It will be seen that single-throw drive arms 14 and 15 taken together constitute, in effect, one double-throw drive arm, and this drive arm is adjustable in the following manner.

As previously stated, corresponding tongues 16 and 16', 17 and 17', 18 and 18' and 19 and 19' of drive arms 14 and 15 are adapted to slidably interfit with grooves 9, 10, 11 and 12. Consequently, by loosening attaching bolts 21 and cover plate 20, each of drive arms 14 and 15 can be moved to various positions on mounting disc 8, maintaining at all times a radial longitudinal axis with respect to mounting disc 8. Thus, the angular relationship of drive arms 14 and 15 with respect to each other and to vertical and horizontal planes through the axis of wiper motor shaft 6 can be varied between wide limits. An example of this is illustrated in Fig. 3 wherein one position of drive arms 14 and 15 is shown in solid lines and a second position is shown in dot-dash lines. In addition, each of drive arms 14 and 15 can be moved radially outwardly on mounting plate 8, since tongues 16, 16', 17, 17', 18, 18', 19 and 19' are of a size to fit in any one of grooves 9, 10, 11 and 12 of mounting plate 8. This feature of adjustability is illustrated in Fig. 3 by the double dot-dash line position of drive arms 14 and 15. Thus, the drive arm of the instant invention is susceptible of both angular and radial adjustment, and this adjustable double-throw drive arm permits the same, identical wiper motor to be installed in a plurality of widely different positions, and without the necessity of providing numerous interchangeable parts. Of course it is obvious that drive arms of different lengths could be interchanged with drive arms 14 and 15 if required by unusual installation problems.

The complete installation is shown in Fig. 5, wherein connecting links 22 and 23 are connected, by means of additional links 27 and 28, to the actuating shafts of wipers 29 and 30. Wiper motor 1 is mounted on the vehicle firewall 31, and wipers 29 and 30 are arranged to oscillate across the surface of windshield 32.

To facilitate the adjustment of drive arms 14 and 15, cover plate 20 is provided with scales and indicia, as at 26, whereby once the proper position for a particular installation is determined, the wiper motor drive arms can be quickly and easily adjusted to that position. Thus, charts can be prepared giving the proper position for each make and type of vehicle, which charts can be referred to in making an installation.

Having fully disclosed and completely described what is believed to be a preferred embodiment of this invention, and the mode of operation thereof, what is claimed as new is as follows:

1. A windshield wiper motor comprising an oscillatory drive shaft, a mounting plate secured to said drive shaft, a plurality of curved grooves in said mounting plate, a plurality of drive arms adapted at one end for connection to a windshield wiper actuating shaft, a plurality of tongues on each of said drive arms, said tongues being of a size to slidably interfit any of said grooves, and means releasably securing said drive arms on said mounting plate, whereby said drive arms can be moved around and toward and away from said drive shaft to assume a plurality of different positions on said mounting plate.

2. In combination with a windshield wiper motor drive shaft, a plurality of drive arms adapted at one end for connection to a windshield wiper actuating shaft, a mounting plate fixed to said motor drive shaft for movement thereby, said mounting plate having various drive arm positioning means and said drive arms having parts adapted to interfit with said various positioning means at a number of angularly and linearly different positions of said drive arms relative to each other, and means releasably securing the other ends of said drive arms in any one of said number of different relative positions on said mounting plate.

3. In combination with a windshield wiper motor having an oscillating drive shaft, double-throw drive arm means adapted at the opposite ends thereof for driving connection with a windshield wiper actuating shaft and having opposite end parts linearly and angularly adjustable relative to each other, and means releasably securing said drive arm means to said drive shaft in any selected position of relative adjustment for movement of the opposite end parts thereof in unison.

4. A windshield cleaner comprising in combination, a wiper motor having an oscillating drive shaft, a plurality of actuating shafts, wipers carried by said actuating shafts, a plurality of drive members, means drivingly connecting one end of said drive members to said actuating shafts, and means including mounting plate means for releasably connecting the other ends of said drive members to said drive shaft, said drive members having positioning projections thereon and said mounting plate means having a plurality of positioning parts adapted to receive said projections in different angularly and linearly relative positions of said drive members whereby to selectively vary the path of movement of said wipers.

5. In combination with a windshield wiper motor having an oscillating drive shaft, a plurality of drive arms each adapted at one end for driving connection with a windshield wiper actuating shaft, mounting plate means on said drive shaft, said mounting plate means being adapted to receive said drive arms in a number of angularly and linearly different relative positions, and clamping means releasably securing the other ends of said drive arms to said mounting plate means in any one of said number of different relative positions, said clamping means including positioning indicia means.

6. In combination with a windshield wiper motor drive shaft, mounting plate means secured to said drive shaft, said mounting plate means having a plurality of curved grooves arranged in concentric relation relative to said drive shaft, a plurality of drive arms adapted at one end for connection to a windshield wiper actuating shaft, said drive arms having projections adapted to slidably interfit any of said grooves for angular and linear adjustment of said drive arms relative to each other and to said drive shaft, and clamp means for releasably securing the other ends of said drive arms in various positions of adjustment on said mounting plate means.

7. In combination with a windshield wiper motor having an oscillating drive shaft, plural drive arms each adapted at one end thereof for driving connection with a windshield wiper actuating shaft, means mounting said drive arms on said drive shaft for selective angular and linear adjustment thereof relative to each other, and means releasably securing said drive arms in adjusted position for movement thereof in unison.

8. In combination with a windshield wiper motor having an oscillating drive shaft, a plurality of drive arms each adapted at one end for driving connection with a windshield wiper actuating shaft, a mounting plate carried by said drive shaft for movement therewith, said mounting plate being adapted to receive said drive arms in a number of different positions providing selective angular and linear adjustment thereof relative to each other, and means including a clamping plate overlying said drive arms and said mounting plate for releasably securing the other ends of said drive arms to said mounting plate in any one of said number of different relative positions.

References Cited in the file of this patent

UNITED STATES PATENTS

| | | |
|---|---|---|
| 215,980 | Scott | May 27, 1879 |
| 1,563,669 | Snyder | Dec. 1, 1925 |
| 2,316,070 | Horton | Apr. 6, 1943 |
| 2,414,040 | Hanner | Jan. 7, 1947 |
| 2,493,552 | Sacchini | Jan. 13, 1950 |
| 2,566,843 | Lappin | Sept. 4, 1951 |
| 2,608,707 | Oishei | Sept. 2, 1952 |

FOREIGN PATENTS

| | | |
|---|---|---|
| 209,161 | Great Britain | Jan. 3, 1924 |